H. J. SEAMAN.
APPARATUS FOR BURNING CEMENT AND RECOVERING THE RESULTING DUST.
APPLICATION FILED NOV. 5, 1915.
1,185,136. Patented May 30, 1916.
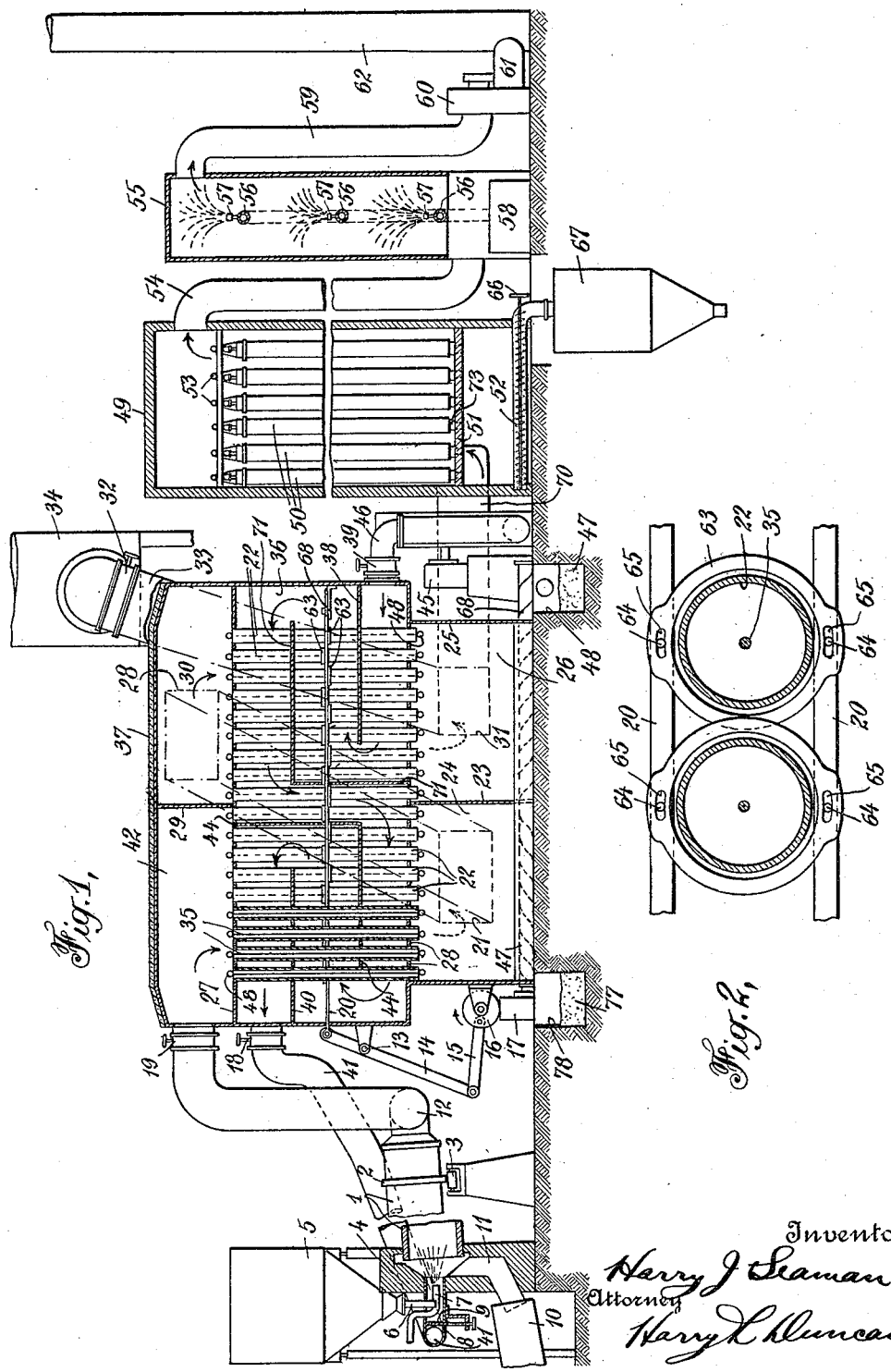

UNITED STATES PATENT OFFICE.

HARRY J. SEAMAN, OF CATASAUQUA, PENNSYLVANIA.

APPARATUS FOR BURNING CEMENT AND RECOVERING THE RESULTING DUST.

1,185,136. Specification of Letters Patent. Patented May 30, 1916.

Application filed November 5, 1915. Serial No. 59,745.

*To all whom it may concern:*

Be it known that I, HARRY J. SEAMAN, a citizen of the United States, and resident of Catasauqua, Lehigh county, Pennsylvania, have made certain new and useful Inventions Relating to Apparatus for Burning Cement and Recovering the Resulting Dust, of which the following is a specification, taken in connection with the accompanying drawings, which form part of the same.

This invention relates especially to apparatus for burning Portland cement and comprises a rotary kiln, together with the usual means for feeding the raw cement material into and gradually through the kiln by its rotation. A firing hood may be arranged in the usual way at the lower end of the kiln and a coöperating injector device may inject powdered coal or other suitable fuel admixed with air into the kiln. The intensely heated kiln gases are discharged from the kiln through a suitable gas passage leading the gases into a preliminary separator separately removing the larger dust particles. If desired this preliminary separator may be provided with substantially vertical gas tubes of any desired shape or construction and arranged with a transfer passage so that the gases may pass down through these tubes and also down through a second separator which may be of the electrostatic type provided, if desired, with similar gas tubes. The space around these gas tubes is preferably divided by suitable baffle plates so that a continuous circulation of air may be maintained through the different separators or sections by a connected supply fan or blower, so that the air is gradually heated as heat is abstracted from the kiln gases until a large amount of heat is thus absorbed in this air supply pipe which is preferably concentrically arranged around the fuel injector at the lower end of the cement kiln. Thus the combustion of the fuel is promoted and correspondingly higher kiln temperatures and efficiencies secured which also gives higher temperatures to the kiln gases so that they can supply more heat to the air supplied to the kiln. The gas tubes in the separator may be provided with electrostatic separating devices such as suitable conductors within the tubes supplied with high tension electricity so as to promote the separation of suspended dust or other particles which are driven outward toward the sides of the tube and fall to the bottom of the collecting chamber below with which a conveyer may coöperate. In this way the electrostatic separator secures the removal of most of the dust particles and its first chamber constituting the preliminary separator device is preferably only given such capacity as to remove these larger particles while the greater part at least of the potash and other desirable alkali material still remains in suspension in the comparatively hot gas. If desired sufficient other sections of the electrostatic separator may be provided so as to sufficiently cool the kiln gases to condense any volatilized potash or other desirable alkali which is therefore separated to a greater extent in these separator sections. The cooled and treated gases from the electrostatic separator are preferably passed through supplemental separating devices comprising a bag separator, the gases then being sufficiently cooled to be passed through the usual fabric bags of such a device by which an efficient separation of substantially all the remaining suspended particles in the gases can be effected, although if desired the gases may be subsequently passed through a spraying or other water scrubber before being discharged by means of a fan and stack.

In the accompanying drawing showing in a somewhat diagrammatic way illustrative embodiments of this invention, Figure 1 is an elevation partly in section; and Fig. 2 is an enlarged detail showing parts of the apparatus.

The cement kiln 1 may be of usual construction comprising a lined steel shell and bearing rings 2 coöperating with suitable bearings, such as 3 on which the kiln may be rotated in a slightly inclined position to feed therethrough cement material which may be fed into the upper end of the kiln in any suitable way. The lower end of the kiln may project within the firing hood 4 formed or lined with masonry or the like which may with advantage form a substantially tight joint with the kiln and be provided with a suitable clinker chute 11 and cooler 10 to receive the burned Portland cement clinker. The fuel feeding apparatus when powdered coal is used may comprise the coal bin 5 with which suitable feeding devices may coöperate so as to deliver the coal in a uniform manner into the passage 6 communicating with any suitable coal injector 7 which may be pointed up the rotary kiln so as to inject thereinto the compact stream of suspended powdered coal and air and produce efficient combustion conditions.

The upper end of the kiln may connect with a suitable kiln gas passage 12 making a substantially tight joint with the kiln and this passage may have a suitable damper or regulating device 19 formed therein adjacent the connected preliminary heating separator. The separator, which may be formed in any desired number of communicating sections, may be of any suitable construction, and if desired formed with a heat insulating lagging 37, the separator preferably comprising gas tubes or passages of any suitable size, shape, construction and arrangement through which the kiln gases pass and in which they are cooled, preferably supplying heat to the surrounding air supply fed into the kiln for supporting combustion therein. The gas tubes 22 may, if desired, be mounted substantially vertically in the tube sheets 27, 28 of the separator and the separator sections may be separated by vertical partitions, such as 23, 29, so that the gases may, if desired, pass into the gas chamber 42 of the first section which may constitute a preliminary heating separator and pass downward through the gas tubes 22 therein into the collecting chamber 24 below and these somewhat cooled gases may then pass up through the diagonally arranged transfer passage 28 into the gas chamber 30 of the second separator section and then pass down through the tubes 22 therein into the collecting chamber 26 below. These gas tubes which may, if desired, be of thin steel or other metal some 10 to 15 inches in diameter, more or less, may have a length of 10 to 20 feet or so as convenient and to promote the passage of air around the tubes in substantially the opposite direction to the flow of heated gas through the tubes suitable baffle plates may be arranged to promote or effect this circulation of the air supplied by any suitable device such as the air supply fan or blower 46 driven, if desired, by an electric or other motor 45. The amount of air entering the space around the gas tubes may be more or less regulated by the valve or damper 39 adjacent the supply fan and then may pass beneath the baffle plate 38 in the direction indicated by the arrows so as to pass horizontally between the tubes until it is returned by the angularly arranged baffle plate 71, the air then again passing to the left above this baffle plate and then down through a passage between the vertical part of this baffle plate and the coöperating baffle plate 44 in the first section of the separator. Another baffle plate 40 above completes this passage, the heated air then passing through the damper 18 and entering the hot air supply pipe 41 which as indicated has its end arranged substantially concentrically about the fuel injector 7 so that this hot air which may be supplied in amounts substantially sufficient for complete combustion of the kiln fuel is forced into the kiln in close contact with the fuel so as to combine therewith to best advantage. It is also desirable to regulate from time to time the amount of the air supplied to the kiln, and for this purpose an accurately adjusted regulating damper 9 is preferably arranged in this hot air supply pipe near the kiln so that the kiln operator may control the burning operation by manipulation of this damper in an obvious way. This is of especial advantage with powdered coal fuel which must be burned under good conditions to give efficient results in burning Portland cement where the clinkering temperature is so high as compared with the combustion temperature practically obtainable.

A suitable collecting device or conveyer 47 may be arranged to coöperate with the collecting chamber of the first separator or section and may, if desired, be operated at the proper speed by a suitable electric or other motor 17. This effects the withdrawal of the dust from the bottom of this collecting chamber and the delivery of this dust 77 into a suitable chamber or conveying passage for further utilization. This first section of the separator is preferably so proportioned as to effect the deposition of a large proportion at least of the larger dust particles in the kiln gases which are still considerably heated when discharged from this section of the separator. In this way the subsequent separating operations which remove from the gases increasingly larger proportions of potash and other desirable products as the gases cool are not so much interfered with by the less valuable dust which consists in large part of raw cement material or the like. A similar conveyer 68 which may, if desired, be operated by the same electric motor 17 may deliver the dust collected in the separating chamber 26 of the second unit, so that this dust 47 falls into a conveyer passage or trough 48 from which it may be removed in any desired way. The gas tubes 22 of this separator may in the last sections when the gases are cooler, or if desired in all the separator sections be provided with one or more electrostatic conductors, such as 35, within each tube which are kept charged at the desired high potential of 30,000 to 50,000 volts or so by any suitable electrical apparatus. As indicated these conductors may each be connected to the supporting rods or conductors 48 supported in any desired way from the casing of the separator and supplied with high tension electric current of a continuous or pulsating character by rectifying an alternating current or otherwise. These electrified conductors which are of any suitable size and character effect the rapid separation of the solid dust particles from the kiln gases passing through these separating tubes, the particles of dust or fumes being electrically driven outward toward the walls of the tubes and adhering thereto or falling down through the tubes toward the bottom of the large settling chamber below. By cooling the kiln gases as through percolation of air around the outside of the separating tubes the volume of the gas is considerably reduced as its temperature falls from the original high temperature at which it is discharged from the cement kiln and the volume of gas is correspondingly reduced and its consequent velocity through the gas tubes falls in a proportioned measure so that the thoroughness of the separation effected in this way may be correspondingly increased. The dust particles which adhere to the inner walls of these gas tubes may be dislodged therefrom in any suitable way as by the mechanical agitation or sharp vibration of the metallic gas tubes to a suitable extent. Suitable agitation means for this purpose may comprise the metal members or agitating rings 63 which may surround the gas tubes preferably adjacent their middle portions and these rings may be operated by suitable agitation bars such as 20 preferably having a loose pin and slot connection with each of the rings as by forming slots 65 in the rings through which the pins 64 secured to the bars may coöperate. Thus when the bars are rapidly reciprocated the heavy rings are brought sharply against the tubes so that their impact causes vibration effects and quite effectively dislodges any adhering dust particles inside the tubes. As indicated in Fig. 1, the bars 20 may be reciprocated by the connected lever 14 pivoted about the pin 13 and also pivoted at its lower end to the connecting rod 15 driven by a crank on the motor or other rotating member 16.

After leaving the final section of the electrostatic separator the gases may if desired be discharged into a suitable kiln stack, such as 34, by opening the control damper 32 in the breeching 33 connecting the collecting chamber 26 with this stack. In most cases it is, however, desirable in order to prevent possible dust injury in the neighborhood of the plant to pass the treated kiln gases through further and more positive separating devices which may comprise a suitable bag separator. As indicated the transfer conduit 70 may take the gases from the collecting chamber 26 into the lower part of the bag chamber 49 having any suitable construction, so that the gases as indicated by the arrows pass up through the annular collars 73 on which the bags 50 are mounted at their lower ends and the gases are thus obliged to pass through these closed top bags which may be mounted on suspending devices 53 as indicated. The fabric of these bags is of such character as not to unduly retard the passage of the gases therethrough, while at the same time practically all the visible dust or solid particles may be removed from the gases and held on the inner surface of the bags from which it may be dislodged from time to time by suitably agitating them. The gases entering this bag separator are preferably cooled to a temperature of not more than a few hundred degrees so that the fabric of the separating devices is not quickly destroyed and this low temperature also insures the condensation of the potash or other alkali material which is volatilized in the cement kiln so that it is in condition to be readily recovered. This material falls to the bottom of the bag chamber and may be removed therefrom by a suitable screw conveyer 52 operated by a pulley or other device 66 so as to deliver this material rich in potash into a receiver 67 from which it may be removed from time to time.

If desired the gases discharged from the bag separator may be passed through a further cleaning apparatus, such for instance, as the water scrubber 55 connected by the pipe 54 with the bag separator so that the gases rising through the scrubber pass through various sprays or showers of water produced as by the spraying nozzles 57 on the pipes 56 so that condensable gases or fumes can be removed in this way before the gases are discharged through the pipe 59 and discharge fan 60 communicating through the conduit 61 with the discharge stack 62. This apparatus makes possible the practically complete removal of solid particles from the kiln gases so that the discharge of the purified gases into the atmosphere is not objectionable or injurious to vegetation. The dust collected from the first separator sections in which the kiln gases are hot may be reburned in the cement kilns and the other dust may be burned or treated in special kilns which may be heated to such temperatures as to cause the potash to be completely volatilized so that its subsequent condensation and utilization may be effected.

This invention has been described in connection with a number of illustrative embodiments, forms, proportions, materials and arrangements of parts, to the details of which disclosure the invention is not of course to be limited, since what is claimed as new and what is desired to be secured by Letters Patent is set forth in the appended claims:

1. In apparatus for burning Portland cement and removing dust from the resultant kiln gases, a rotary kiln, means for injecting into the lower end of said kiln a stream of pulverized fuel suspended in air, a preliminary heating separator connected to the upper end of said kiln by a passage making substantially tight joint therewith, said separator comprising a plurality of sections each having sets of substantially vertical gas tubes for the passage of the kiln gases, transfer passages between said sections to enable the kiln gases to pass downward through all of said tubes, highly charged electrostatic conductors extending through said gas tubes to promote separation of dust particles from said kiln gases, baffle plates arranged around said gas tubes and a coöperating air supply blower device to force air around said gas tubes in a direction contrary to the movement of the kiln gases therethrough to cool said kiln gases and correspondingly heat the air from said supply device, a hot air supply pipe receiving the air heated in said separator and having its discharge end arranged substantially concentrically around the fuel injector, a regulating valve in said supply pipe adjacent said injector to regulate the air supplied to the kiln, a supplemental separator comprising a bag separator connected to said electrostatic separator and receiving the treated kiln gases therefrom a water scrubber connected to said bag separator and a discharge fan and stack to draw the kiln gases through said separators and discharge the same and means to separately remove the material from the heated kiln gases in the first section of said electrostatic separator and means to separately remove the material separated from the kiln gases by the other of said separators.

2. In apparatus for burning Portland cement and removing dust from the resultant kiln gases, a rotary kiln, means for injecting into the lower end of said kiln a stream of fuel suspended in air, a preliminary heating separator connected to the upper end of said kiln, said separator comprising a plurality of sections each having sets of substantially vertical gas tubes for the passage of the kiln gases, transfer passages between said sections to enable the kiln gases to pass downward through all of said tubes, highly charged electrostatic conductors extending through said gas tubes to promote separation of dust particles from said kiln gases, baffle plates arranged around said gas tubes and a coöperating air supply device to force air around said gas tubes to cool said kiln gases and correspondingly heat the air from said supply device, a hot air supply pipe receiving the air heated in said separator and having its discharge end arranged substantially concentrically around the fuel injector, a regulating valve in said supply pipe adjacent said injector to regulate the air supplied to the kiln, a supplemental separator comprising a bag separator connected to said electrostatic separator and receiving the treated kiln gases therefrom, and means to separately remove the material from the heated kiln gases in said separators.

3. In apparatus for burning Portland cement and removing dust from the resultant kiln gases, a rotary kiln, means for injecting into the lower end of said kiln a stream of pulverized fuel suspended in air, a heating separator arranged to receive kiln gases discharged from said kiln, said separator comprising a plurality of sections each having sets of substantially vertical gas tubes for the passage of the kiln gases, transfer passages between said sections to enable the kiln gases to pass downward through all of said tubes, highly charged electrostatic conductors extending into said gas tubes to promote separation of dust particles from said kiln gases, baffle plates arranged around said gas tubes and a coöperating air supply device to effect the passage of air around said gas tubes in a direction contrary to the movement of the kiln gases therethrough and cool said kiln gases and correspondingly heat the air from said supply device, a hot air supply pipe receiving the air heated in said separator and having its discharge end arranged substantially concentrically around the fuel injector and a regulating valve in said supply pipe adjacent said injector to regulate the air supplied to the kiln.

4. In apparatus for burning Portland cement and removing dust from the resultant kiln gases, a rotary kiln, means for injecting into the lower end of said kiln a stream of pulverized fuel suspended in air, a heating separator arranged to receive kiln gases discharged from said kiln, said separator comprising substantially vertical gas tubes for the passage of the kiln gases, highly charged electrostatic conductors extending into said gas tubes to promote separation of dust particles from said kiln gases, a coöperating air supply device to effect the passage of air around said gas tubes in a direction contrary to the movement of the kiln gases therethrough and cool said kiln gases and correspondingly heat the air from said supply device, a hot air supply pipe receiving the air heated in said separator and having its discharge end arranged in coöperation with the fuel injector, and a regulating valve in said supply pipe adjacent said injector to regulate the air supplied to the kiln.

5. In apparatus for burning Portland cement and removing dust from the resultant kiln gases, a rotary kiln, means for injecting into the lower end of said kiln a stream of pulverized fuel suspended in air, a heating separator arranged to receive kiln gases discharged from said kiln, said separator comprising gas tubes for the passage of the kiln gases, highly charged electrostatic conductors extending into said gas tubes to promote separation of dust particles from said kiln gases, a coöperating air supply device to effect the passage of air around said gas tubes and cool said kiln gases and correspondingly heat the air from said supply device, a hot air supply pipe receiving the air heated in said separator and having its discharge end arranged in coöperation with the fuel injector.

6. In apparatus for burning Portland cement and removing dust from the resultant kiln gases, a rotary kiln, means for injecting into the lower end of said kiln a stream of pulverized fuel suspended in air, a preliminary heating separator connected to the upper end of said kiln to receive the hot kiln gases therefrom, means to supply the air for combustion in said kiln to said separator to preliminarily heat the same from the hot kiln gases, means to remove from said preliminary separator the dust separated from the kiln gases therein, an electrostatic separator receiving the treated and cooled kiln gases to separate solid material therefrom and a supplemental separator comprising a bag separator connected to said electrostatic separator to receive the kiln gases treated therein and substantially completely remove the solid matter from said treated kiln gases.

7. In apparatus for burning Portland cement and removing dust from the resultant kiln gases, a rotary kiln, means for injecting into the lower end of said kiln a stream of fuel suspended in air, a preliminary heating separator connected to the upper end of said kiln to receive the hot kiln gases therefrom, means to supply air for combustion in said kiln to said separator to preliminarily heat the same from the hot kiln gases, an electrostatic separator receiving the treated and cooled kiln gases to separate solid material therefrom and a supplemental separator comprising a bag separator connected to said electrostatic separator to receive the kiln gases treated therein and substantially completely remove the solid matter from said treated kiln gases.

8. In apparatus for burning Portland cement and removing dust from the resultant kiln gases, a rotary kiln, means for injecting into the lower end of said kiln a stream of fuel suspended in air, a preliminary separator connected to the upper end of said kiln to receive the hot kiln gases therefrom, an electrostatic separator receiving the treated and cooled kiln gases to separate solid material therefrom and a supplemental separator comprising a bag separator connected to said electrostatic separator to receive the kiln gases treated therein and remove solid matter from said treated kiln gases.

9. In apparatus for burning Portland cement and removing dust from the resultant kiln gases, a rotary kiln, means for heating said kiln involving combustion of fuel therein, a preliminary separator connected to said kiln to receive hot kiln gases therefrom, means to supply air for combustion in said kiln to said separator to preliminarily heat the same from the hot kiln gases, a succeeding electrostatic separator receiving the treated and cooled kiln gases to separate solid material therefrom, a supplemental separator comprising separator bags connected to said succeeding separator to receive the kiln gases treated therein and adapted to substantially completely remove the objectionable solid matter from said kiln gases and means to separately remove and utilize the dust separated from the kiln gases in said successive separators.

10. In apparatus for burning Portland cement and removing dust from the resultant kiln gases, a rotary kiln, means for heating said kiln involving combustion of fuel therein, a preliminary separator connected to said kiln to receive the hot kiln gases therefrom, a succeeding separator receiving the treated and cooled kiln gases to separate solid material therefrom, a supplemental separator comprising separator bags connected to said succeeding separator to receive the kiln gases treated therein and adapted to remove objectionable solid matter from said kiln gases and means to separately remove and utilize the dust separated from the kiln gases in said successive separators.

HARRY J. SEAMAN.

Witnesses:
   FLORENCE W. ULRICH,
   ELENA B. SCHIFIEEN.

Copies of this patent may be obtained for five cents each, by addressing the "Commissioner of Patents, Washington, D. C."